United States Patent
Sailor (10) Patent No.: US 7,130,920 B1
(45) Date of Patent: Oct. 31, 2006

(54) LOAD BALANCING MULTICAST CONNECTION SCHEDULING IN 3-STAGE TDM FABRICS

(75) Inventor: Kenneth Evert Sailor, Saskatoon (CA)

(73) Assignee: PMC-Sierra, Inc., Santa Clara, CA (US)

( * ) Notice: Subject to any disclaimer, the term of this patent is extended or adjusted under 35 U.S.C. 154(b) by 820 days.

(21) Appl. No.: 10/359,618

(22) Filed: Feb. 7, 2003

Related U.S. Application Data (60) Provisional application No. 60/359,702, filed on Feb. 27, 2002.

(51) Int. Cl.
G06F 15/173 (2006.01)
(52) U.S. Cl. ............... 709/238; 709/232; 709/235; 370/218; 370/387; 370/388; 710/316
(58) Field of Classification Search ........... 709/238, 709/232, 235; 370/218, 387, 388, 356; 710/316; 718/105; 340/2.2, 2.21
See application file for complete search history.

(56) References Cited

U.S. PATENT DOCUMENTS

| | | | |
|---|---|---|---|
| 6,032,190 A * | 2/2000 | Bremer et al. ............... | 709/238 |
| 6,580,715 B1 * | 6/2003 | Bare ........................... | 370/396 |
| 6,804,731 B1 * | 10/2004 | Chang et al. .................. | 710/53 |
| 2003/0088694 A1 * | 5/2003 | Patek et al. .................. | 709/238 |
| 2004/0066785 A1 * | 4/2004 | He et al. ................ | 370/395.21 |
| 2004/0095927 A1 * | 5/2004 | Chang et al. ............... | 370/388 |
| 2005/0060427 A1 * | 3/2005 | Phillips et al. .............. | 709/238 |

FOREIGN PATENT DOCUMENTS

| | | |
|---|---|---|
| EP | 0942624 A1 * | 9/1999 |
| EP | 1113627 A2 * | 4/2001 |
| JP | 09312648 A * | 12/1997 |

OTHER PUBLICATIONS

"TrueWay: A highly scalable Multi-Plane Multi-Stage Buffered Packet Switch" Chao et al. Department of Electrical and Computer Engineering Polytechnic University.*
"Analysis of the Parallel Packet Switch Architecture", Iyer et al. Member, IEEE, IEEE/ACM transactions on networking, vol. 11, No. 2, Apr. 2003.*
"Switching and Traffic Theory for Integrated Broadband Networks," Joseph Y. Hui, Kluwer Academic Publishers, Boston, 1990, pp. 53-112.
"Algebraic Switching Theory and Broadband Applications," Shuo-Yen Robert Li, Academic Press, San Diego, 2001, pp. 43-77 & 207-265.
"The Necessary Conditions for Clos-Type Nonblocking Multicast Networks," Yuanyuan Yang and Gerald M. Masson, IEEE Transactions on Computers, 48:11, Nov. 1999, pp. 1214-1227.

(Continued)

Primary Examiner—ThuHa Nguyen
(74) Attorney, Agent, or Firm—Oyen Wiggs Green & Mutala LLP (57) ABSTRACT

A multicast connection scheduling method for a 3-stage switch fabric with $n_1$ first stage, $n_2$ second stage and $n_3$ third stage interconnected switching devices. The first and third stage devices are non-blocking for unicast connections. The center stage devices are non-blocking for multicast connections. Load tables are provided for each center stage device, with one row per first and/or third stage device. Each row represents the number of connections being serviced between the first and/or third stage devices, through the center stage device corresponding to the table. By monitoring and updating the tables, the invention derives an approximately optimal connection schedule for an input list of connection requests, such that no input connection load exceeds any center stage device's maximum input connection load capacity and no output connection load exceeds any center stage device's maximum output connection load capacity.

20 Claims, 7 Drawing Sheets

OTHER PUBLICATIONS

"Wide-Sense Nonblocking Networks," Paul Feldman, Joel Friedman, and Nicholas Pippenger, SIAM J. Discrete Math., 1:2, May 1988, pp. 158-173.

"On Blocking Probability of Multicast Networks," Yuanyuan Yang and Jianchao Wang, IEEE Transactions on Computers, 46:7, Jul. 1998, pp. 957-968.

* cited by examiner

LOAD BALANCING MULTICAST CONNECTION SCHEDULING IN 3-STAGE TDM FABRICS

REFERENCE TO RELATED APPLICATION

This application claims the benefit of U.S. Provisional Patent Application Ser. No. 60/359,702 filed 27 Feb. 2002.

TECHNICAL FIELD

This invention facilitates scheduling of multicast connection requests ("calls") on 3-stage time division multiplexing switch fabrics, or equivalent fabrics, such that no input or output load exceeds any switch's internal connection capacity.

BACKGROUND

Time division multiplexing (TDM) is a useful technique for aggregating lower speed data streams into higher speed streams for transmission across a network. Typically, TDM traffic is used in connection-based, fixed bandwidth networks like the SONET data network. In such a network, alignment of data streams is crucial at switching nodes, since data is switched based on its arrival time. TDM switches typically operate based on a static setup that enables desired switching patterns. A new connection is serviced by creating a new data path through the network using control signaling outside the data path—the data path must be fully configured from end to end before any data can be transmitted. By contrast, packet-based or connectionless networks transmit data packets which include the address information required to enable each packet to reach its destination. Connectionless networks can dynamically adopt switching configurations to suit currently available packets. However, connectionless networks are subject to congestion problems if many packets which must share a network path are suddenly simultaneously received. Connection-oriented networks manage congestion perfectly, at the expense of wasted bandwidth if there is no traffic for an established connection.

TDM networks typically carry multiplexed traffic by allocating a portion of the total available connection time to each connection, based on some regular timing scheme. For example, a single SONET OC-12 connection is a multiplexed aggregate of 12 STS-1 connections. Each STS-1 connection is regularly allocated $\frac{1}{12}$th of the total available connection time to serially transmit its next 8 bits (i.e. byte) via an optical connection, as specified in the SONET standard. Each STS-1 connection byte is referred to as a "grain" of that connection. 12 STS-1 connection grains aggregated to make up an OC-12 connection are called a "grain group." Each grain group is numerically ordered, from the first to the twelfth grain of the corresponding STS-1s. A TDM switch typically accepts a number of multiplexed input connections and switches them, not as the aggregates it receives, but at some lower level, delivering newly reconstituted aggregates at its outputs.

TDM switches can be characterized by their capability to service arbitrary loads of connection requests (calls). For example, a switch is "non-blocking" if any load of calls can always be mapped successfully from the switch's input ports to the switch's output ports, regardless of any existing call load being serviced by the switch. A switch is "rearrangeably non-blocking" if servicing a new call may require rearrangement (without interruption) of existing calls to enable the switch to service a call that would otherwise be blocked. A "strictly non-blocking switch" can service any new load of calls, provided all of the switch inputs and outputs required to service the load are available (i.e. unused). A switch is "blocking" if there are possible existing call load states for which no input-to-output port mapping rearrangement will enable the switch to successfully map a new call load from the switch's input ports to the switch's output ports.

Strictly non-blocking switches require hardware proportional to the square of the number of inputs and the number of grains per input, or $O(n^2g^2)$ where n is the number of inputs and g is the number of grains per input. Hardware complexity can be reduced to $O(n^2+g^2)$ by using a so-called Clos architecture or its equivalent (Time:Space:Time or Space:Time:Space architectures, for example). But, such hardware savings compromise switching capability: the reduced hardware complexity switch is only rearrangeably non-blocking for unicast calls (i.e. a call in which one ingress grain is scheduled for delivery to one egress port); it is blocking for arbitrary loads of multicast calls (i.e. a call in which one ingress grain is scheduled for delivery to more than one egress port). Moreover, a scheduling algorithm must be used to determine how to route each new call through the reduced hardware complexity switch, taking into account all previously scheduled calls being handled by the switch. Hardware can be added to allow a switch to handle more calls—for example by increasing multicasting capability and eliminating the need to rearrange existing calls. But, regardless of whether a switch is strictly non-blocking for arbitrary loads of multicast calls, rearrangeably non-blocking for restricted widths of multicast calls (i.e. a call in which one ingress grain is scheduled for delivery to less than some predefined maximum number of egress ports), or simply blocking under certain conditions, physical limitations often prevent construction of switches of needed capacities.

Figure 1:
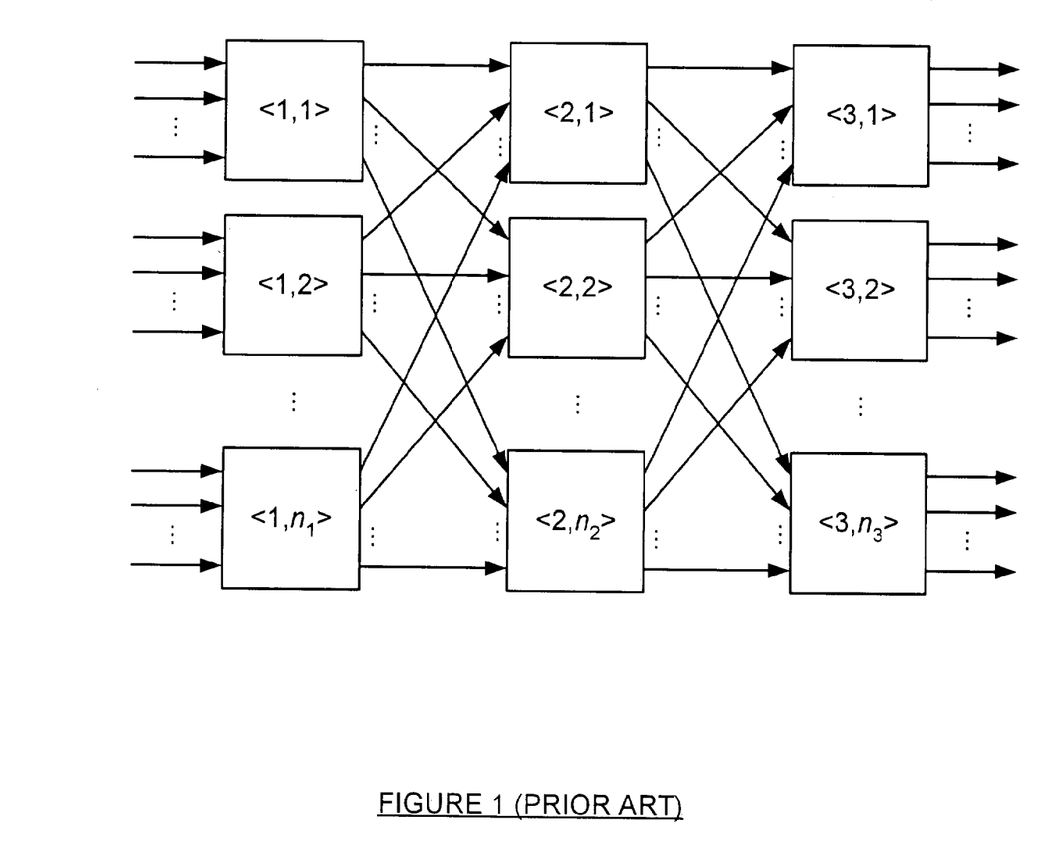
FIG. 1 schematically depicts a 3-stage switching fabric having $n_1$, $n_2$ and $n_3$ first, second and third stage devices, respectively.

In order to build larger switches, switching fabrics are formed by connecting switches together in regular patterns. One useful wiring pattern is a 3-stage fabric with 3 columns of switches regularly connected together, as shown in FIG. 1. The first stage (column) of the FIG. 1 fabric has $n_1$ devices, each labeled <a,b> where a=1 and b=1, ..., $n_1$. The second (center) stage of the FIG. 1 fabric has $n_2$ devices, each labeled <a,b> where a=2 and b=1, ..., $n_2$. The third stage of the FIG. 1 fabric has $n_3$ devices, each labeled <a,b> where a=3 and b=1, ..., $n_3$. An output of each first stage device is connected to deliver a maximum input connection load of $t_i$ grains to an input of each center stage device. Each first stage device has a total input capacity $i_t$ grains, and usually $i_t \leq n_2 \cdot t_i$. An output of each center stage device is connected to deliver a maximum output connection load of $t_o$ grains to an input of each third stage device. Each third stage device has a total output capacity $o_t$ grains, and usually $o_t \leq n_2 \cdot t_o$.

Ideally, the center stage devices are designed so that they are non-blocking for whatever level of multicast calls the fabric is required to handle—all multicasting is handled by the center stage. Center stage devices with reduced multicasting capability can be used if corresponding degradation in multicast capability is acceptable. The first and third stage devices are designed so that they are non-blocking for unicast calls. The FIG. 1 fabric has an input speedup factor $i_s = n_2 \cdot t_i / i_t$, an output speedup factor $o_s = n_2 \cdot t_o / o_t$, a total input capacity of $n_1 \cdot i_t$ calls and a total output capacity of $n_3 \cdot o_t$ calls. In some applications, $i_s$ and $o_s$ simultaneously have values greater than 1. In other applications, $i_s$ or $o_s$, or both, simultaneously have values less than 1. Typically, a fabric's speedup is the same into and out of the center stage, in which case the fabric's overall speedup factor $s=i_s=o_s$. But, s can be expressed in different ways, one common example being $s=\min(i_s,o_s)$. Of course, if input capacity exceeds output capacity, then some switching capacity is unused. Conversely, if output capacity exceeds input capacity, additional output capacity can be "created" by multicasting calls to achieve full switching capacity usage. Although FIG. 1 shows only one connection between any two devices, persons skilled in the art will understand that each depicted connection represents aggregate connective capacity between two devices. In such fabrics, it is common to have multiple physical links connecting two switches. $t_i$ and $t_o$ thus represent, respectively, total connection load capacity of all physical links into and out of the center stage.

The FIG. 1 fabric's aggregate bandwidth is equal to the lowest bandwidth of any of the 3 columns of switches. In this way, fabrics of arbitrary size can be built from any smaller sized switches. The 3-stage fabric is a conceptual organization that can take many real forms. For example, the first and third stage switches of a conceptual 3-stage fabric are often a single physical device. This allows a fabric's first and third stages to be located at a convenient ingress/egress point (physical ingress/egress connectors are often co-located). 3-stage fabrics are somewhat equivalent to Clos networks, in that they are not strictly non-blocking without impractical amounts of speedup, require a scheduling algorithm to derive a switch setting for scheduling a newly received call, and may require rearrangement of existing (i.e. previously scheduled) calls to facilitate scheduling of a newly received call.

For each newly received call, the scheduling algorithm examines the new call and the existing switch setting used to service the switch's existing call load, to determine a new switch setting that will preserve all existing end-to-end calls while permitting the new call to be scheduled. Here, "preserve" means that the inputs and outputs of each previously scheduled call are maintained in the new switch setting, although the internal path through the 3-stage fabric may differ (i.e. be rearranged). The optimal new switch setting is one that rearranges the fewest existing calls and leaves the fabric's latent (i.e. unused) switching capability evenly balanced among all switches. The problem of determining optimal switch settings for a 3-stage fabric is "NP-complete," meaning that there is no known way to solve the problem other than generating all possible switching schedules and examining them to determine which one is optimal.

Figure 2:
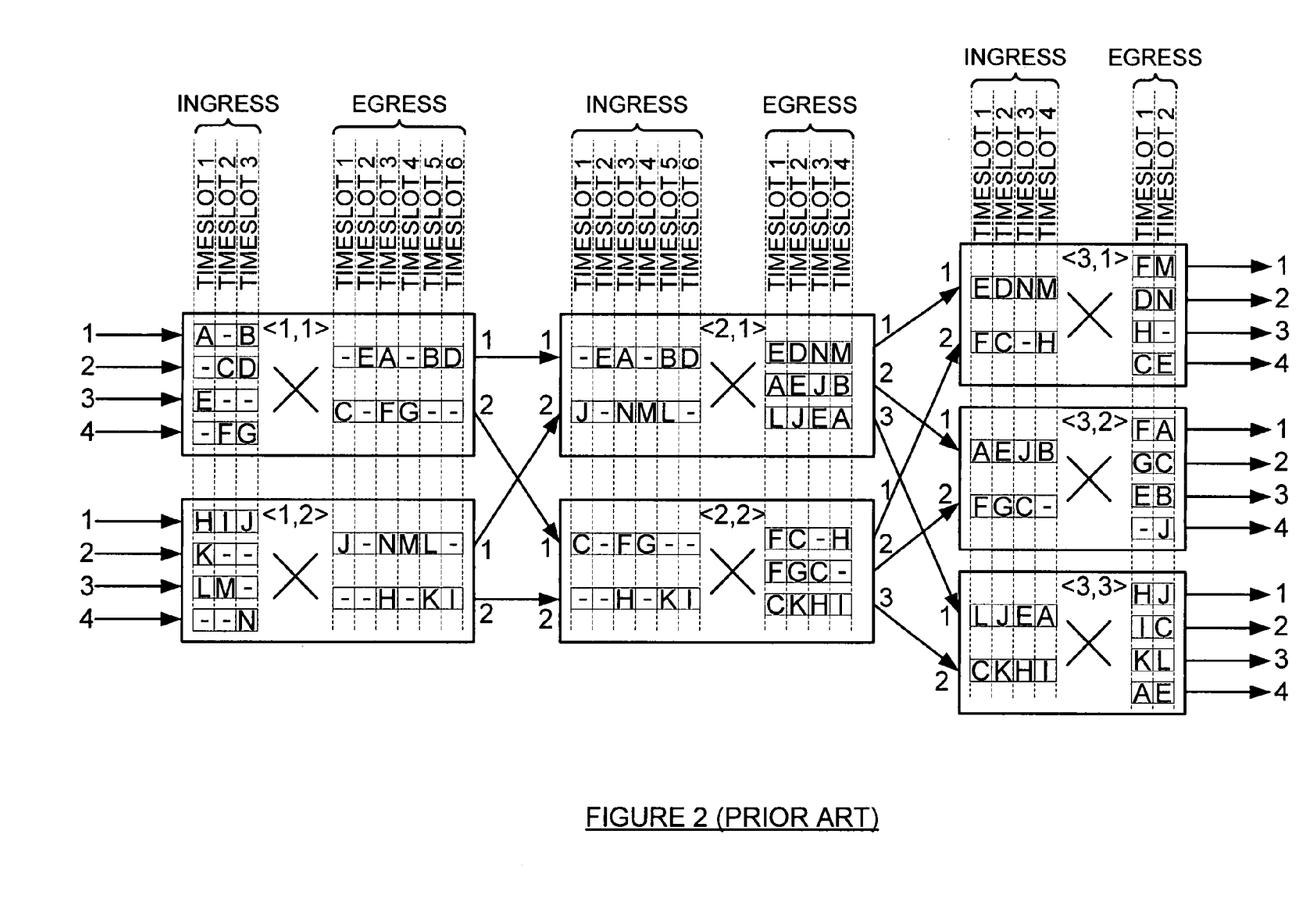
FIG. 2 depicts a simple 3-stage switching fabric for which $n_1=n_2=2$ and $n_3=3$. Each first stage switch receives 3 grains on each of 4 input ports and outputs 6 grains on each of 2 output ports. Each second stage switch receives 6 grains on each of 2 input ports and outputs 4 grains on each of 3 output ports. Each third stage switch receives 4 grains on each of 2 input ports and outputs 2 grains on each of 4 output ports.

FIG. 2 depicts a simple 3-stage switching fabric for which $n_1=n_2=2$ and $n_3=3$. The first stage has $n_1=2$ switches, each of which is capable of receiving 3 grains on each of 4 input ports and outputting 6 grains on each of 2 output ports. The second stage has $n_2=2$ switches, each of which is capable of receiving 6 grains on each of 2 input ports and outputting 4 grains on each of 3 output ports. The third stage has $n_3=3$ switches, each of which is capable of receiving 4 grains on each of 2 input ports and outputting 2 grains on each of 4 output ports.

More particularly, each output port of each first stage device is connected to deliver $t_i=6$ grains to an input port of each center stage device; and, each output port of each center stage device is connected to deliver $t_o=4$ grains to an input port of each third stage device. Each first stage device has a total input capacity $i_t \leq n_2 \cdot t_i = 2 \cdot 6 = 12$ grains. Each third stage device has a total output capacity $o_t \leq n_2 \cdot t_o = 2 \cdot 4 = 8$ grains. The FIG. 2 fabric has an input speedup factor $i_s=n_2 \cdot t_i/i_t=2 \cdot 6/12=1$, an output speedup factor $o_s=n_2 \cdot t_o/o_t=2 \cdot 4/8=1$, an overall speedup factor $s=i_s \cdot o_s=1 \cdot 1=1$, a total input capacity $n_1 \cdot n_2 \cdot t_i=2 \cdot 2 \cdot 6=24$ calls and a total output capacity $n_3 \cdot n_2 \cdot t_o 3 \cdot 2 \cdot 4=24$ calls.

In the particular situation depicted in FIG. 2, switch <1, 1> has received at its input port 1 an input signal consisting of grain A assigned to a first ingress timeslot, nothing assigned to a second ingress timeslot, and grain B assigned to a third ingress timeslot. At its input port 2, switch <1, 1> has received an input signal consisting of nothing assigned to the first ingress timeslot, grain C assigned to the second ingress timeslot, and grain D assigned to the third ingress timeslot. At its input port 3, switch <1, 1> has received an input signal consisting of grain E assigned to the first ingress timeslot, and nothing assigned to the second or third ingress timeslots. At its input port 4, switch <1, 1> has received an input signal consisting of nothing assigned to the first ingress timeslot, grain F assigned to the second ingress timeslot, and grain G assigned to the third ingress timeslot. Switch <1, 1> rearranges its input signals by reassigning (unicasting) grains A and B to its output port 1's egress timeslots 3 and 5 respectively, reassigning grain C to output port 2's egress timeslot 1, reassigning grains D and E to output port 1's egress timeslots 6 and 2 respectively, and reassigning grains F and G to output port 2's egress timeslots 3 and 4 respectively.

Switch <1,2> has received at its input port 1 an input signal consisting of grain H assigned to the first ingress timeslot, grain I assigned to the second ingress timeslot, and grain J assigned to the third ingress timeslot. At its input port 2, switch <1,2> has received an input signal consisting of grain K assigned to the first ingress timeslot, and nothing assigned to the second or third ingress timeslots. At its input port 3, switch <1,2> has received an input signal consisting of grain L assigned to the first ingress timeslot, grain M assigned to the second ingress timeslot and nothing assigned to the third ingress timeslot. At its input port 4, switch <1,2> has received an input signal consisting of nothing assigned to the first or second ingress timeslots, and grain N assigned to the third ingress timeslot. Switch <1,2> rearranges its input signals by reassigning (unicasting) grains H and I to its output port 2's egress timeslots 3 and 6 respectively, reassigning grain J to output port 1's egress timeslot 1, reassigning grain K to output port 2's egress timeslot 5, and reassigning grains L, M and N to output port 1's egress timeslots 5, 4 and 3 respectively.

Output port 1 of switch <1, 1> is connected as aforesaid to deliver $t_i=6$ grains to input port 1 of switch <2, 1>, output port 2 of switch <1, 1> is connected to deliver $t_i=6$ grains to input port 1 of switch <2,2>, output port 1 of switch <1,2> is connected to deliver $t_i=6$ grains to input port 2 of switch <2, 1>, and output port 2 of switch <1,2> is connected to deliver $t_i=6$ grains to input port 2 of switch <2,2>.

Switch <2,1> rearranges its input signals by 2-casting grain A to its output port 2's egress timeslot 1 and to its output port 3's egress timeslot 4, unicasting grain B to output port 2's egress timeslot 4, unicasting grain D to output port 1's egress timeslot 2, 3-casting grain E to its output port 1's egress timeslot 1 and to its output port 2's egress timeslot 2 and to its output port 3's egress timeslot 3, 2-casting grain J to its output port 2's egress timeslot 3 and to its output port 3's egress timeslot 2, unicasting grain L to output port 3's egress timeslot 1, and unicasting grains M and N to output port 1's egress timeslots 4 and 3 respectively.

Switch <2,2> rearranges its input signals by 3-casting grain C to its output port 1's egress timeslot 2 and to output port 2's egress timeslot 3 and to output port 3's egress timeslot 1, 2-casting grain F to output port 1's egress timeslot 1 and to output port 2's egress timeslot 1, unicasting grain G to output port 2's egress timeslot 2, 2-casting grain H to output port 1's egress timeslot 4 and to output port 3's egress timeslot 3, and unicasting grains I and K to output port 3's egress timeslots 4 and 2 respectively.

Output port 1 of switch <2, 1> is connected as aforesaid to deliver $t_o$=4 grains to input port 1 of switch <3, 1>, output port 2 of switch <2, 1> is connected to deliver $t_o$=4 grains to input port 1 of switch <3,2>, output port 3 of switch <2, 1> is connected to deliver $t_o$=4 grains to input port 1 of switch <3,3>, output port 1 of switch <2,2> is connected to deliver $t_o$=4 grains to input port 2 of switch <3,1>, output port 2 of switch <2,2> is connected to deliver $t_o$=4 grains to input port 2 of switch <3,2>, and output port 3 of switch <2,2> is connected to deliver $t_o$=4 grains to input port 2 of switch <3,3>.

Switch <3, 1> rearranges its input signals by reassigning (unicasting) grains F and M to its output port 1's egress timeslots 1 and 2 respectively, reassigning grains D and N to output port 2's egress timeslots 1 and 2 respectively, reassigning grain H to output port 3's egress timeslot 1, and reassigning grains C and E to output port 4's egress timeslots 1 and 2 respectively.

Switch <3,2> rearranges its input signals by reassigning (unicasting) grains F and A to its output port 1's egress timeslots 1 and 2 respectively, reassigning grains G and C to output port 2's egress timeslots 1 and 2 respectively, reassigning grains E and B to output port 3's egress timeslots 1 and 2 respectively, and reassigning grain J to output port 4's egress timeslot 2.

Switch <3,3> rearranges its input signals by reassigning (unicasting) grains H and J to its output port 1's egress timeslots 1 and 2 respectively, reassigning grains I and C to output port 2's egress timeslots 1 and 2 respectively, reassigning grains K and L to output port 3's egress timeslots 1 and 2 respectively, and reassigning grains A and E to output port 4's egress timeslots 1 and 2 respectively.

To be entirely unambiguous, a call must be specified in terms of its associated input device, port and timeslot; and, its associated output device(s), port(s) and timeslot(s) parameters. A unicast call can be specified as X:(w→x), a 2-cast call can be specified as X:(w→x, y) and a 3-cast call can be specified as X:(w→x, y, z) where X is the label of the call that originates at <stage, device, port, timeslot>w and is received at <stage, device, port, timeslot> x, y and z respectively. Call labels are analogous to grains. Thus, in FIG. 2, each letter-labeled grain represents a different call. The calls currently scheduled on the FIG. 2 fabric are:

A:(<1,1,1,1>→<3,2,1,2>, <3,3,4,1>)
B:(<1,1,1,3>→<3,2,3,2>)
C:(<1,1,2,2>→<3,1,4,1>, <3,2,2,2>, <3,3,2,2>)
D:(<1,1,2,3>→<3,1,2,1>)
E:(<1,1,3,1>→<3,1,4,2>, <3,2,3,1>, <3,3,4,2>)
F:(<1,1,4,2>→<3,1,1,1>, <3,2,1,1>)
G:(<1,1,4,3>→<3,2,2,1>)
H:(<1,2,1,1>→<3,1,3,1>, <3,3,1,1>)
I:(<1,2,1,2>→<3,3,2,1>)
J:(<1,2,1,3>→<3,2,4,2>, <3,3,1,2>)
K:(<1,2,2,1>→<3,3,3,1>)
L:(<1,2,3,1>→<3,3,3,2>)
M:(<1,2,3,2>→<3,1,1,2>)
N:(<1,2,4,2>→<3,1,2,2>)

Figure 3A:
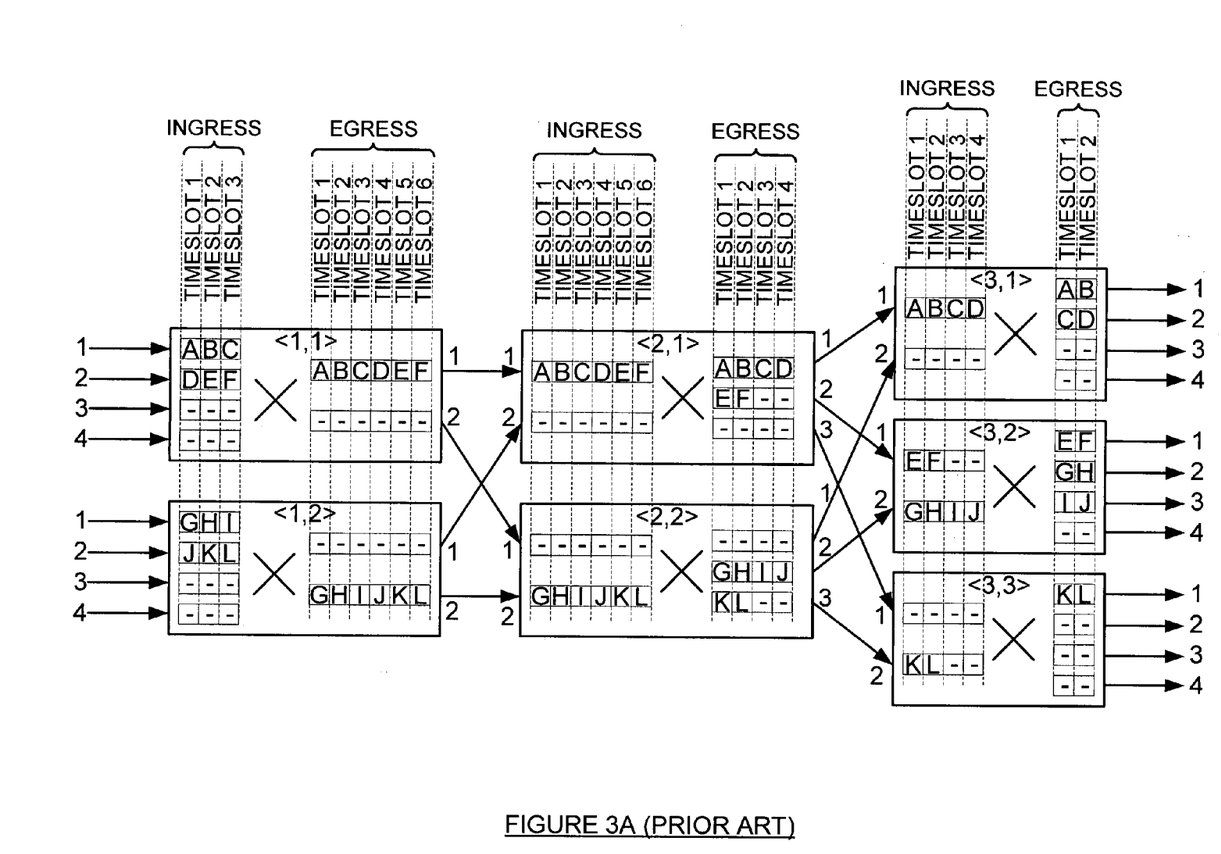
FIG. 3A shows the FIG. 2 fabric carrying an unbalanced call load which blocks connections from switch <1, 1> to switch <3,2> and from switch <1,2> to switch <3,2>, preventing scheduling of calls that could otherwise utilize unused input ports 3 or 4 of switches <1, 1> or <1,2> and unused output port 4 of switch <3,2>.

FIG. 3A shows the FIG. 2 fabric carrying calls:
A:(<1,1,1,1>→<3,1,1,1>1)
B:(<1,1,1,2>→<3,1,2,2>)
C: (<1,1,1,3>→<3,1,2,1>)
D:(<1,1,2,1>→<3,1,2,2>)
E:(<1,1,2,2>→<3,2,1,1>)
F:(<1,1,2,3>→<3,2,1,2>)
G:(<1,2,1,1>→<3,2,2,1>)
H:(<1,2,1,2>→<3,2,1,2>)
I:(<1,2,1,3>→<3,2,3,1>)
J:(<1,2,2,1>→<3,2,3,2>)
K:(<1,2,2,2>→<3,3,1,1>)
L:(<1,2,2,3>→<3,3,1,2>).

Suppose that a new call M:(<1,1,3,1>→<3,2,4,1>) is to be scheduled on the FIG. 3A fabric. That new call cannot be routed through switch <1, 1> to switch <3,2> even though input port 3 of switch <1, 1> is unused and output port 4 of switch <3,2> is unused. This is because the connection between switch <1, 1> and switch <2, 1> is already carrying its maximum of $t_i$=6 grains and the connection between switch <2,2> and switch <3,2> is already carrying its maximum of $t_o$=4 grains. Similarly, a new call N:(<1,2,3, 1>→<3,1,4,1>) cannot be routed through switch <1,2> to switch <3, 1> even though input port 3 of switch <1,2> is unused and output port 4 of switch <3,1> is unused, because the connection between switch <1,2> and switch <2,2> is already carrying its maximum of $t_i$=6 grains and the connection between switch <2, 1> and switch <3, 1> is already carrying its maximum of $t_o$=4 grains. Potentially available switching capacity via unused input ports 3, 4 of switch <1, 1> to unused output port 4 of switch <3,2> and similar capacity from unused ports of switch <1,2> to switch <3, 1> is thus wasted, reducing the fabric's overall scheduling capability unless the existing call load can be rearranged to improve the fabric's scheduling capability. Such rearrangement is not always possible. It can thus be seen that even if a 3-stage fabric is constructed of strictly non-blocking switching devices, the overall fabric can be blocking, due to the foregoing connection allocation problem.

Figure 3B:
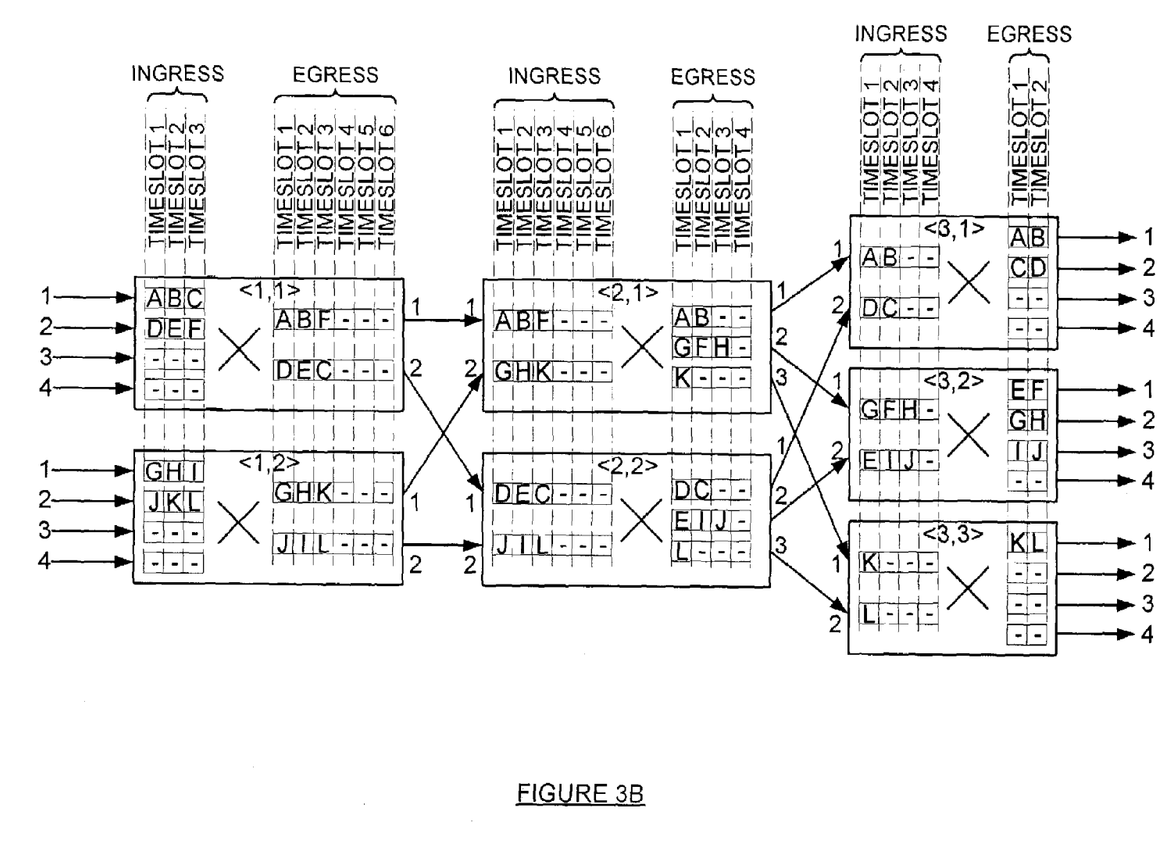
FIG. 3B shows the same fabric and call load as FIG. 3A, but with the load evenly balanced on each connection between each first and second stage switch and on each connection between each second and third stage switch.

FIG. 3B shows the FIG. 2 fabric carrying the same call load as in FIG. 3A, but with the load evenly balanced between each first and second stage switch and between each second and third stage switch. Specifically, the load between switch <1, 1> and switch <2, 1> is 3 grains, as is the load between switch <1, 1> and switch <2,2>, the load between switch <1,2> and switch <2, 1> and the load between switch <1,2> and switch <2,2>. The load between switch <2, 1> and switch <3, 1> is 2 grains, as is the load between switch <2,2> and switch <3, 1>; the load between switch <2, 1> and switch <3,2> is 3 grains, as is the load between switch <2,2> and switch <3,2>; and, the load between switch <2, 1> and switch <3,3> is 1 grain, as is the load between switch <2,2> and switch <3,3>. Thus, although the FIG. 3B fabric is carrying the same call load as the FIG. 3A fabric, the FIG. 3B fabric can carry the new call M:(<1,1,3,1>→<3,2,4,1>) whereas the FIG. 3A fabric cannot.

For example, because the load between switch <1, 1> and switch <2, 1> is less than $t_i$=6 grains and the load between switch <2, 1> and switch <3,2> is less than $t_o$=4 grains, call M:(<1,1,3,1>→<3,2,4,1>) can be routed through switch <1, 1> to switch <2, 1> and thence to switch <3,2>. Alternatively, because the load between switch <1, 1> and switch <2,2> is less than $t_i$=6 grains and the load between switch <2,2> and switch <3,2> is less than $t_o$=4 grains, call M:(<1, 1,3,1>→<3,2,4,1>) could be routed through switch <1, 1> to switch <2,2> and thence to switch <3,2>. Similarly, call N:(<1,2,3,1>→<3,1,4,1>) could be routed through switch <1,2> to switch <2, 1> and thence to switch <3,2>; or, through switch <1,2> to switch <2,2> and thence to switch <3,2>.

This invention facilitates call load balancing to improve a switching fabric's connection scheduling capability.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The connection load state of each center stage switching device is represented in a table, e.g. the first 5 rows of Table 1 represent the hypothetical state of center stage switching device <2, 1> of a fabric having $n_1=16$ first stage switching devices, $n_2=4$ center stage switching devices and $n_3=16$ third stage switching devices.

In each row of Table 1, the "Input Load" column represents the number of calls currently being serviced by connections established between the first stage switching device corresponding to that row and the center stage switching device to which the table corresponds. Thus, 8 calls are currently being serviced by connections established between switches <1, 1> and <2, 1>; 23 calls are currently being serviced by connections established between switches <1,2> and <2, 1>; 12 calls are currently being serviced by connections established between switches <1,3> and <2, 1> etc. Furthermore, in each row of Table 1, the "Output Load" column represents the number of calls currently being serviced by connections established between the third stage switching device corresponding to that row and the center stage switching device to which the table corresponds. Thus, 48 calls are currently being serviced by connections established between switches <2, 1> and <3, 1>; 23 calls are currently being serviced by connections established between switches <2, 1> and <3,2>; 25 calls are currently being serviced by connections established between switches <2, 1> and <3,3> etc. Since $n_1$ and $n_3$ are not necessarily equal, as is for example the case for the fabric of FIGS. 2, 3A and 3B, the Input Load column could have more rows than the Output Load column, or vice versa. Alternatively, two tables can be provided: one for the input load and another for the output load.

TABLE 1

| 1st & 3rd Stage Switching Devices | Input Load (calls) | Output Load (calls) |
|---|---|---|
| 1 | 8 | 48 |
| 2 | 23 | 23 |
| 3 | 12 | 25 |
| 4 | 19 | 32 |
| 5 | 14 | 19 |

$n_2$ such tables can represent the entire connection load state of a fabric having $n_2$ center stage switching devices.

The problem is to schedule an input list of calls such that no input load exceeds any center stage switching device's maximum input connection load capacity of $t_i$ grains and no output load exceeds any center stage switching device's maximum output connection load capacity of $t_o$ grains. Ideally, the connection load is as evenly balanced as possible between the center stage switching devices, in the sense that in a "perfectly" balanced loading situation the connection load state tables for each center stage switching device are identical; and, any two tables can be interchanged without affecting either table's connection load state representation. In such a "perfect" situation, each center stage switching device is equally capable of accepting the next call. Whether a perfectly even loading solution exists depends on the input list of calls: most lists do not have a perfect solution. An optimal solution representing the "most nearly perfect" solution is the next best solution if no perfect solution exists.

As previously explained, an optimal solution to the foregoing call scheduling problem is believed to be "NP-complete," meaning that there is no known way to solve the problem other than generating all possible switching schedules and examining them to determine which one is optimal. The optimal problem is related to bin packing and other well-known NP-complete problems, and highly exponential due to the number of possible schedules that can service any list of calls.

Although it may be time-consuming or impossible to derive an optimal solution to the foregoing connection scheduling problem, an acceptable approximate solution is relatively easily derived in accordance with this invention. The approximate solution implemented by the invention can be characterized as a greedy, first-fit within best-fit algorithm. "Greedy" means that the algorithm makes a simple calculation on a good approximation without ever reconsidering the approximation-even if a better approximation becomes available. "First-fit" means that the algorithm uses the first valid schedule it finds to schedule a call. "Best-fit" means that the call load currently scheduled on each center stage device is considered for each newly received call, and the device which best suits the new call is selected to schedule that call. Here, "best" means selecting the device which will minimize differences in input and output port loading on all of the center stage devices, after the new call is scheduled. The object is to ideally maintain equal input and output port loads on each center stage device at all times.

In accordance with the invention, a connection load table is initialized for each center stage switching device. Each initialized connection load table has one entry for each connected first stage switching device and one entry for each connected third stage switching device, with the loads initialized to zero. As previously explained, if $n_1 \neq n_3$, some table rows will have only one entry. Calls are then considered in arbitrary order, as is now described with respect to FIGS. 4A and 4B.

Upon receipt of a request to schedule a call (FIG. 4A, block 10) a center stage switching device counter is initialized to one (block 12). A test (block 14) is then made to determine whether the center stage switching device corresponding to the counter has the capacity to schedule the received call. That is, the test determines whether the center stage switching device corresponding to the counter has an unused input side connection which can be coupled to an unused egress side of one if the first stage switching devices, and an unused output side connection which can be coupled to an unused ingress side of one if the third stage switching devices. If the test result is positive (block 14, "Yes" output) then a calculation (block 16) is made to determine the total input and output connection load of the center stage switching device corresponding to the counter for the inputs and outputs required to satisfy the received call. The total is saved in a suitable memory location and a further test (block 18) is made to determine whether the fabric contains any more center stage switching devices. The block 18 test is also made if the block 14 test result is negative (block 14, "No" output). If the block 18 test result is positive (block 18, "Yes" output) then the counter is then incremented (block 20) and the block 14 test and succeeding steps are repeated for the center stage switching device corresponding to the incremented counter.

Figure 4A:
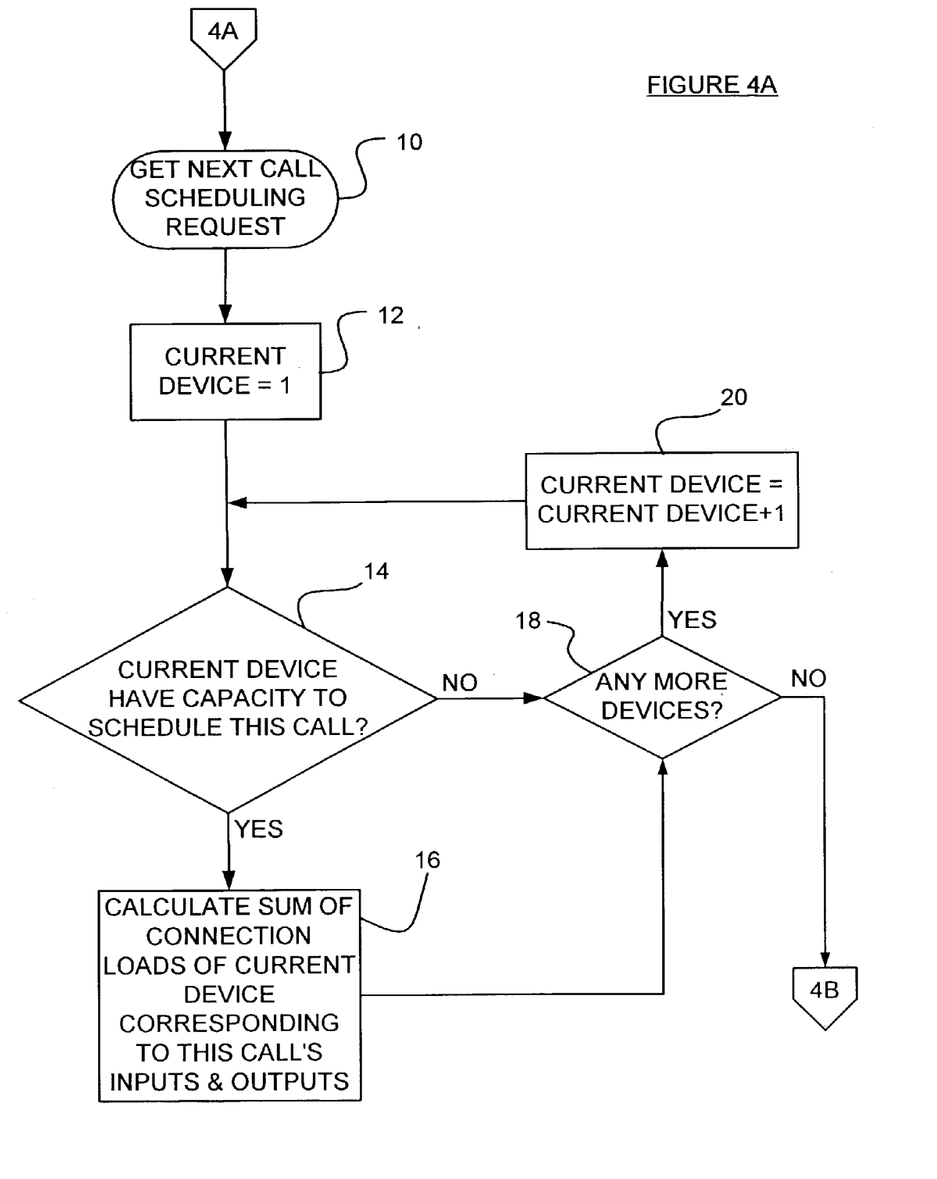
FIGS. 4A and 4B provide a simplified flowchart depiction of the operations performed in scheduling calls in accordance with the invention.

The block 18 test result is negative (block 18, "No" output) if all center stage switching devices in the fabric which have the capacity to schedule the received call have been considered in accordance with blocks 14, 16, 18 and 20 as aforesaid. In such case, a further test (FIG. 4B, block 22) is made to determine whether one of the center stage switching devices having the capacity to schedule the received call has a lower input and output connection load sum (as calculated in block 16) than any of the other center stage switching devices having the capacity to schedule the received call. If the block 22 test result is positive (block 22, "Yes" output) then the call is scheduled (block 24) on the center stage switching device having the lower input and output connection load sum, and the connection load table corresponding to that device is updated by incrementing the input load in the table row for the first stage switching device corresponding to the just-scheduled call's input and incrementing the output load in the table row for the third stage switching device(s) corresponding to the just-scheduled call's output(s). Processing then continues at block 10 with the next call scheduling request.

Figure 4B:
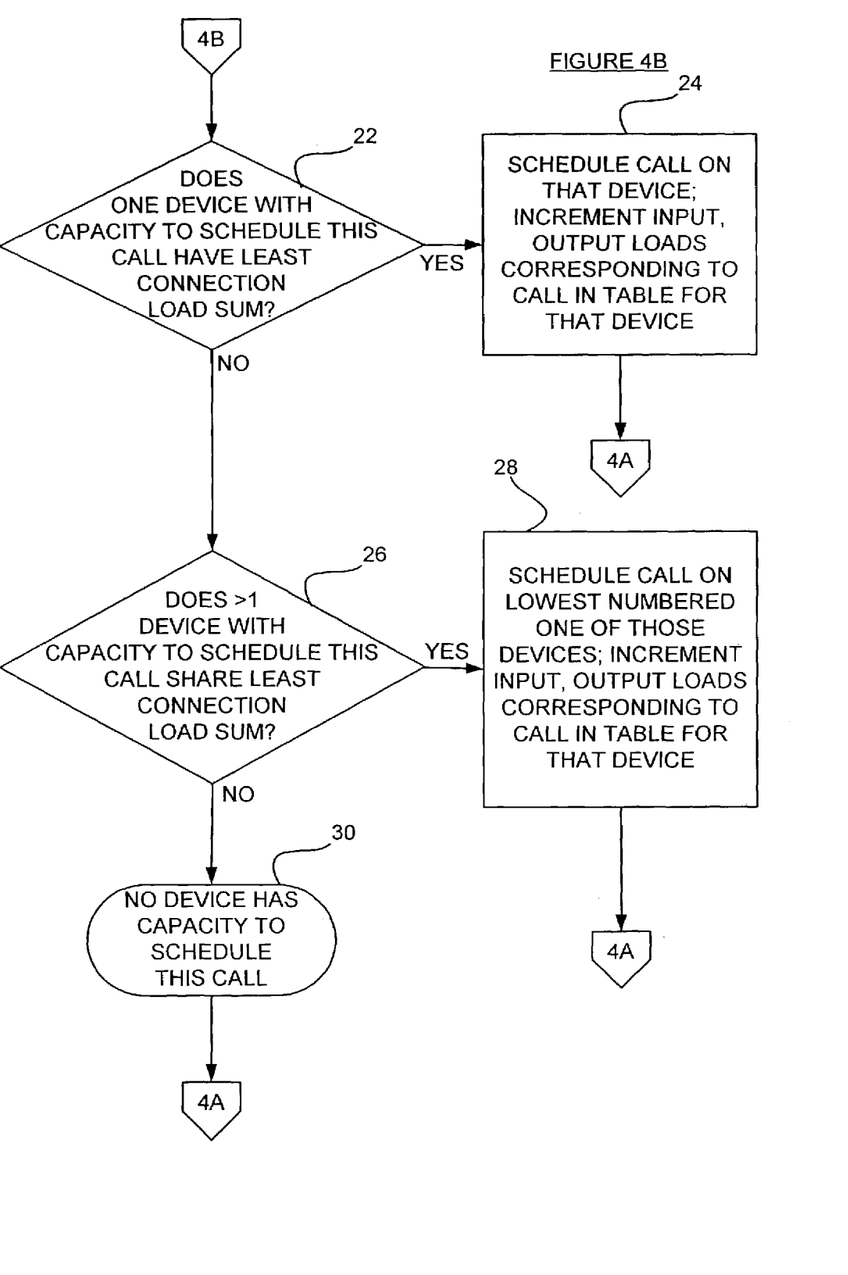

If the block 22 test result is negative (block 22, "No" output) then a further test (block 26) is made to determine whether two or more center stage switching devices having the capacity to schedule the received call have equal input and output connection load sums (as calculated in block 16) which are lower than those of any of the other center stage switching devices having the capacity to schedule the received call. If the block 26 test result is positive (block 26, "Yes" output) then the received call is scheduled (block 28) on the lowest numbered one of the center stage switching devices having such equal sums, and the connection load table corresponding to that device is updated by incrementing the input load in the table row for the first stage switching device corresponding to the just-scheduled call's input and incrementing the output load in the table row for the third stage switching device(s) corresponding to the just-scheduled call's output(s). (In a fabric having $n_2=4$ center stage switching devices, those devices are consecutively numbered $\{1, 2, 3, 4\}$ corresponding to the <stage, device> set $\{<2, 1>, <2,2>, <2,3>$ and $<2,4>\}$). Processing then continues at block 10 with the next call scheduling request.

If the block 26 test result is negative (block 26, "No" output) then it is concluded (block 30) that the received call cannot be scheduled on any of the fabric's center stage switching devices, and processing continues at block 10 with the next call scheduling request.

For example, consider a fabric (not shown) having $n_2=2$ center stage switching devices, each having 6 inputs and 6 outputs, and each capable of sustaining a maximum connection loading of 48 for each input and output. Assume that some calls have already been scheduled, leaving the connection load state tabulated below:

| | Center Stage Device 1 | |
|---|---|---|
| 1st & 3rd Stages | Input Load | Output Load |
| 1 | 8 | 48 |
| 2 | 23 | 23 |
| 3 | 12 | 25 |
| 4 | 19 | 32 |
| 5 | 14 | 19 |
| 6 | 48 | 24 |

| | Center Stage Device 2 | |
|---|---|---|
| 1st & 3rd Stages | Input Load | Output Load |
| 1 | 12 | 34 |
| 2 | 35 | 48 |
| 3 | 16 | 25 |
| 4 | 19 | 32 |
| 5 | 14 | 19 |
| 6 | 34 | 24 |

For the purposes of the invention, only the first and third stage switching devices are significant. Although input device, port and timeslot; and, output device, port and timeslot parameters are required to fully describe a call as aforesaid, it is only necessary, in accordance with the invention, to consider which first stage device is delivering the grain and which third stage device(s) must receive the grain. In the following discussion therefore, a reduced-parameter call designation such as "(2→3, 4)" is used instead of a full-parameter designation of the same call such as (<1,2,x,y>→<3,3,z,w>, <3,4,r,s>) for some appropriate values of x, y, z, w, r, and s. Also note that in the call designation "(2→3, 4)" the first and third stage switching devices (i.e. first stage device 2 and third stage devices 3,4) are used to read appropriate values from the connection load table.

Suppose that a request to schedule the 2-cast call (2→3, 4) is received (i.e. a request to schedule a connection from input port 2 to output ports 3 and 4). In accordance with FIG. 4A, block 14 a test is made to determine whether the first center stage switching device has the capacity to schedule the call (2→3, 4). It does, since its input load from device <1,2> is 23 which is less than the maximum input load of 48 calls, its output load to device <3,3> is 25 which is less than the maximum output load of 48 calls, and its output load to device <3,4> is 32 which is again less than the maximum output load of 48 calls. Similarly, the second center stage switching device also has the capacity to schedule the call (2→3, 4) since its input load from device <1,2> is 35, its output load to device <3,3> is 25, and its output load to device <3,4> is 32.

In accordance with FIG. 4A, block 16 a calculation is made to determine the total input and output connection load of each center stage switching device for the inputs and outputs required to satisfy the received call. The total current load for the first center stage device at input 2 and outputs 3, 4 is 23+25+32=80 calls; the total current load for the second center stage device at the same inputs and outputs is 35+25+32=89 calls. Since the first device's sum (80) is lower than the second device's sum (89), the call is scheduled on the first center stage device. That device's connection load table is then updated by incrementing the device <1,2> input load from 23 to 24 calls, incrementing the device <3,3> output load from 25 to 26 calls, and incrementing the device <3,4> output load from 32 to 33 calls. If the total current load for the first center stage device had equaled the total current load for the second center stage device, then the call would have been scheduled on the lower numbered (i.e. the first) center stage device.

A previously scheduled connection can be deleted by performing a simple decrement operation. Specifically, in the input connection load table corresponding to the center stage device on which the connection to be deleted was previously scheduled, the representation contained in the row corresponding to the first stage switching device corresponding to the input port requirement of the connection to be deleted is decremented by one. Similarly, in the output connection load table corresponding to the center stage device on which the connection to be deleted was previously scheduled, the representation contained in each row corresponding to each third stage switching device corresponding to an output port requirement of the connection to be deleted is decremented by one.

Figure 5:
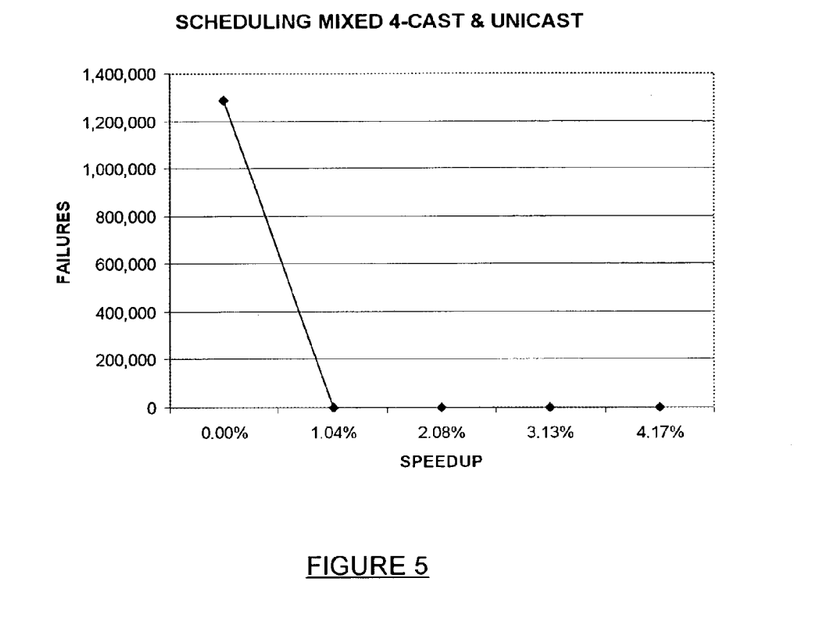
FIG. 5 graphically depicts the number of scheduling failures vs. speedup for a simulation of mixed 4-cast and unicast calls involving 1,000,000 tests per speedup increment.

Simulation results reveal the invention's efficacy. FIG. 5 graphically depicts the number of scheduling failures vs. speedup (expressed as a percentage). The notional fabric corresponding to FIG. 5 is a 3-stage 320 Gbps SONET STS-1 switching fabric with $n_1$=16 first stage switching devices, each with an input capacity of 20 Gbps or eight 2.488 Gbps STS-48 inputs. Since switching is performed at an STS-1 level, $i_f$=384. The simulated fabric has $n_2$=16 third stage switching devices, each with an output capacity of 20 Gbps or eight 2.488 Gbps STS-48 outputs, and similarly $o_f$=384. The center stage is composed of $n_2$=4 switching devices, each having a nominal switching capacity of 80 Gbps, which is increased ("sped-up") in simulation to assess the effect of speedup to the invention. Initially $t_i$=$t_o$=96, representing the 96 STS-1's that each first stage switching device could present to each second stage device (for a total of 384 per first stage device) and the 96 STS-1's that each third stage device could receive from each second stage device. $t_i$ and $t_o$ are then increased by 1 to a maximum of 102, representing two physical STS-51 connections or a maximum speedup of 102/96=1.0625. As previously explained, the invention approximates the optimal solution to the connection scheduling problem. The FIG. 5 simulation reveals that practical load balancing is achieved with marginal speedup.

More particularly, the data plotted in FIG. 5 was derived by simulating 1,000,000 tests per speedup increment for a 3-stage switch fabric having $n_2$=4 center stage switching devices with two connections from each first stage switching device to each center stage switching device. Each test attempted to schedule 100% random loads of mixed 4-cast and unicast calls, where the percentage of unicast calls ranged from 0% to 100% of the load and the inputs ranged from 0% to 100% protected. A simple extrapolation of the graph implies a failure rate less than $10^{-6}$.

Figure 6:
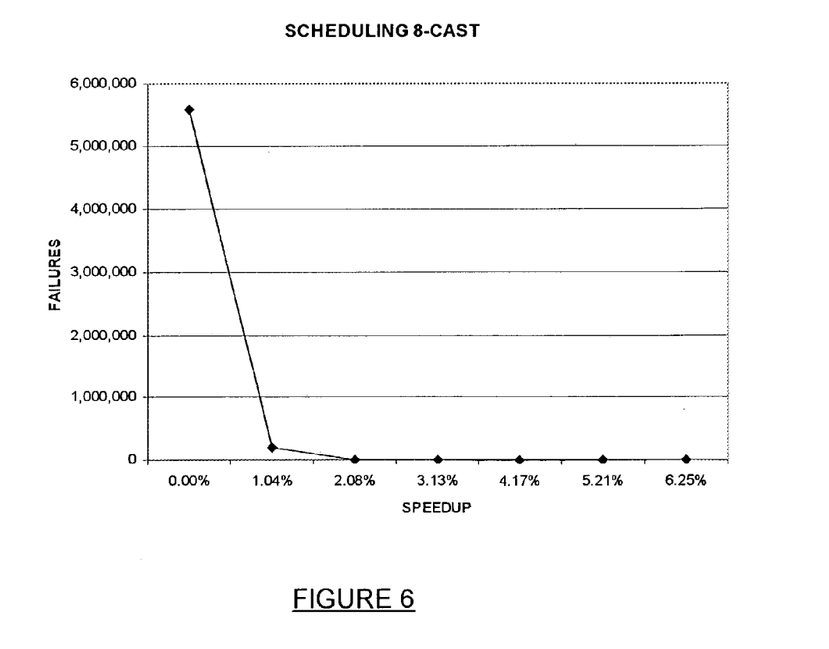
FIG. 6 is similar to FIG. 5, but depicts the results of a simulation involving 8-cast calls.

FIG. 6 reveals similar behavior in scheduling 8-cast calls. The improvement between 1 and 2 speedup timeslots increases over the improvement between 0 and 1 timeslots. A simple extrapolation of the graph implies a failure rate less than $10^{-20}$ for 8-cast.

Often, more than one copy of a signal is sent through a network to provide greater assurance that the signal will reach its destination intact, surviving even dynamic equipment failure. At certain points in the network, the best (e.g. least degraded) copy of the input signal is selected as the source for any output signals continuing through the network. Such selection is called "inverse multicast." Advantageously, the selection is made in the center stage of a 3-stage fabric, since on detection of signal degradation only the switch settings of a single device need to be changed to select a better available signal. Inverse multicast increases the difficulty of the connection scheduling problem, since the overlapping inputs can generate complex conflicts between resource requirements. All multicast calls represented in FIGS. 5 and 6 have inverse multicast, providing an opportunity to assess the need to handle protection switching effectively. Typically, it is unusual to have more than two copies (called "working" and "protect") of a signal source per connection. Both working and protect copies of the signal are brought into the fabric and the best copy is selected as aforesaid.

The invention provides a rearranging, probabilistically non-blocking scheduling technique. Rearranging means that the fabric can easily be rebalanced by rescheduling all calls in order to overcome the effect of call deletions, which can leave the fabric in a highly imbalanced state. This is not a problem for a provisioned network, but it is unacceptable in a highly dynamic network where the number of call requests scheduled per second reflects the scheduling algorithm's effectiveness. The invention is probabilistically non-blocking in the sense that a hard bound on the quality of solutions has not been found. The invention provides an effective means of scheduling with minimal speedup and renders feasible switching fabrics with greater than 1 Tbps (terabit per second) capacity in 3-stage networks of memory devices.

As will be apparent to those skilled in the art in the light of the foregoing disclosure, many alterations and modifications are possible in the practice of this invention without departing from the spirit or scope thereof. For example, persons skilled in the art will understand that some fabrics having more than 3 stages are topologically equivalent to 3-stage fabrics. The invention can be applied to any 3-stage fabric, followed by translation of the fabric into some topologically equivalent fabric having more than 3 stages. Furthermore, switching fabrics are commonly formed as recursive constructions of 3-stage fabrics: e.g. each switching device in a 3-stage fabric is actually a 3-stage fabric itself. The invention can be applied both at the overall fabric level, and at the individual switching device level.

The invention can also be adapted for use in non-ideal switching fabrics having center stage devices which are blocking for whatever level of multicast calls the fabric is required to handle, and/or having first and/or third stage devices which are blocking for unicast calls. This can be achieved in conjunction with the previously described load table monitoring and updating technique, by querying the switching devices to see if they can accept a new call and only scheduling the call if all three of the required first, center and third stage devices can accept the call. Suppose for example that a request to schedule the 2-cast call A:(1→3, 4) is received at a time when the load tables reveal that a non-multicast-capable center stage switch <2, 1> has sufficient capacity to schedule the call. Unicast-blocking switch <1, 1> is then queried to see if it can deliver the input grain to switch <2, 1>. Since switch <1, 1> is blocking for unicast, it may not be able to deliver the input grain, in which case the process is repeated for the next center stage switch which the load tables reveal has sufficient capacity to schedule the call. If switch <1, 1> can deliver the input grain to switch <2, 1>, switch <2, 1> is then queried to see if it can multicast the input from switch <1, 1> to switches <3,3> and <3,4>. Since switch <2,1> is blocking for multicast, it may not be able to perform the required multicast operation, in which case the process is repeated for the next center stage switch which the load tables reveal has sufficient capacity to schedule the call. If switch <2, 1> can multicast the input from switch <1,1> to switches <3,3> and <3,4>, switches <3,3> and <3,4> are then queried to see if they can each route an input from switch <2, 1> to the required output ports. If either of switches <3,3> or <3,4> cannot route an input from switch <2, 1> to the required output ports the process is repeated for the next center stage switch which the load tables reveal has sufficient capacity to schedule the call. Conceivably, a connection request may fail even if the fabric has sufficient link capacity, because one of the needed switches is blocked on each alternative connection routing path.

As another example, instead of performing the FIG. 4A, block 16 calculation of the total input and output connection load of each center stage switching device for the inputs and outputs required to satisfy the received call, one could calculate the average loading on the input and output ports of the received call. But, the average calculation is more computationally intensive than the total calculation and the result is mathematically equivalent since the same divisor (the number of input and output ports required by the call) is used to compute each average.

As another alternative, instead of saving each total (or average) in a suitable memory location then determining the lowest total (or average) as previously explained in relation to FIG. 4B, block 22; one could compare each newly derived total (or average) with a previously determined lowest total (or average), retaining the newly derived total (or average) as the lowest total (or average) if the newly derived total (or average) exceeds the previously determined lowest total (or average), and otherwise discarding the newly derived total (or average). This reduces memory requirements since only two totals (or averages) are retained, whereas the FIG. 4B, block 22 technique potentially requires retention of one total (or average) per center stage device.

As another alternative, instead of breaking a FIG. 4B, block 26, "Yes" output "tie," in which two or more center stage switching devices having the capacity to schedule the received call have equal input and output connection load sums by scheduling the received call on the lowest numbered one of the center stage switching devices having such equal sums; one could schedule the call on a randomly selected one of the center stage switching devices having such equal sums.

The scope of the invention is to be construed in accordance with the substance defined by the following claims.

What is claimed is:

1. A multicast connection scheduling method for a 3-stage switch fabric having $n_1$ first stage switching devices, $n_2$ center stage switching devices and $n_3$ third stage switching devices, wherein:
 (a) each first stage switching device has an output connected to an input of each center stage switching device;
 (b) each third stage switching device has an input connected to an output of each center stage switching device;
 the method comprising:
 (c) for each one of the $n_2$ center stage switching devices:
  (i) providing an input connection load table having one row for each one of the $n_1$ first stage switching devices, each row containing a representation of a number of connections currently being serviced by connections established between the first stage switching device corresponding to that row and the center stage switching device to which the input connection load table corresponds;
  (ii) providing an output connection load table having one row for each one of the $n_3$ third stage switching devices, each row containing a representation of a number of connections currently being serviced by connections established between the third stage switching device corresponding to that row and the center stage switching device to which the output connection load table corresponds;
  (iii) storing in each row of the input connection load table a representation that no connections are currently being serviced by connections established between the first stage switching device corresponding to that row and the center stage switching device to which the input connection load table corresponds;
  (iv) storing in each row of the output connection load table a representation that no connections are currently being serviced by connections established between the third stage switching device corresponding to that row and the center stage switching device to which the output connection load table corresponds;
 (d) for each connection request received by the 3-stage switch fabric:
  (i) for each center stage switching device having sufficient connection capacity to service the connection request, determining a sum of input and output connection loads currently being serviced by the center stage switching device on input and output ports of the center stage switching device corresponding to input and output port requirements of the connection request;
  (ii) if at least one center stage switching device has sufficient connection capacity to service the connection request and if the sum has a lowest value for exactly one center stage switching device:
   (1) scheduling the connection request on the exactly one center stage switching device;

(2) in the input connection load table corresponding to the exactly one center stage switching device, incrementing by one the representation contained in the row corresponding to the first stage switching device corresponding to the input port requirement of the connection request;

(3) in the output connection load table corresponding to the exactly one center stage switching device, incrementing by one the representation contained in each row corresponding to each third stage switching device corresponding to the output port requirement of the connection request;

(iii) if at least two center stage switching devices have sufficient connection capacity to service the connection request and if the sum has a lowest value for two or more center stage switching devices:

(1) scheduling the connection request on a selected one of the two or more center stage switching devices;

(2) in the input connection load table corresponding to the selected one of the two or more center stage switching devices, incrementing by one the representation contained in the row corresponding to the first stage switching device corresponding to the input port requirement of the connection request;

(3) in the output connection load table corresponding to the selected one of the two or more center stage switching devices, incrementing by one the representation contained in each row corresponding to each third stage switching device corresponding to the output port requirement of the connection request; and, (iv) if no center stage switching device has sufficient connection capacity to service the connection request, failing to schedule the connection request.

2. A method as defined in claim 1, wherein the selected one of the two or more center stage switching devices is a lowest numbered one of the two or more center stage switching devices.

3. A method as defined in claim 2, wherein:
(a) each first stage switching device is non-blocking for unicast connections;
(b) each center stage switching device is non-blocking for a predefined level of multicast connections; and,
(c) each third stage switching device is non-blocking for unicast connections.

4. A method as defined in claim 1, wherein the selected one of the two or more center stage switching devices is a randomly selected one of the two or more center stage switching devices.

5. A method as defined in claim 4, wherein:
(a) each first stage switching device is non-blocking for unicast connections;
(b) each center stage switching device is non-blocking for a predefined level of multicast connections; and,
(c) each third stage switching device is non-blocking for unicast connections.

6. A method as defined in claim 1, further comprising determining the lowest value of the sum by:
(a) initializing a previously determined lowest value of the sum to a predefined initialization value;
(b) for each one of the $n_2$ center stage switching devices, if the previously determined lowest value of the sum is one of:
(i) an initialization value;

(ii) greater than the sum of the input and output connection loads currently being serviced by the center stage switching device on the input and output ports of the center stage switching device corresponding to the input and output port requirements of the connection request;

replacing the previously determined lowest value of the sum with the sum of the input and output connection loads currently being serviced by the center stage switching device on the input and output ports of the center stage switching device corresponding to the input and output port requirements of the connection request; and, (c) then utilizing the previously determined lowest value of the sum as the lowest value of the sum.

7. A method as defined in claim 6, wherein:
(a) each first stage switching device is non-blocking for unicast connections;
(b) each center stage switching device is non-blocking for a predefined level of multicast connections; and,
(c) each third stage switching device is non-blocking for unicast connections.

8. A method as defined in claim 1, further comprising, for each connection deletion request received by the 3-stage switch fabric:
(a) determining the center stage switching device on which a connection corresponding to the connection deletion request is currently scheduled;
(b) in the input connection load table corresponding to the determined center stage switching device, decrementing by one the representation contained in the row corresponding to the first stage switching device corresponding to an input port requirement of the connection deletion request; and,
(c) in the output connection load table corresponding to the determined center stage switching device, decrementing by one the representation contained in each row corresponding to each third stage switching device corresponding to an output port requirement of the connection deletion request.

9. A method as defined in claim 8, wherein:
(a) each first stage switching device is non-blocking for unicast connections;
(b) each center stage switching device is non-blocking for a predefined level of multicast connections; and,
(c) each third stage switching device is non-blocking for unicast connections.

10. A method as defined in claim 1, wherein:
(a) each first stage switching device is non-blocking for unicast connections;
(b) each center stage switching device is non-blocking for a predefined level of multicast connections; and,
(c) each third stage switching device is non-blocking for unicast connections.

11. A multicast connection scheduling method for a 3-stage switch fabric having $n_1$ first stage switching devices, $n_2$ center stage switching devices and $n_3$ third stage switching devices, wherein:
(a) each first stage switching device has an output connected to an input of each center stage switching device;
(b) each third stage switching device has an input connected to an output of each center stage switching device;

the method comprising:
(c) for each one of the $n_2$ center stage switching devices:

(i) providing an input connection load table having one row for each one of the $n_1$ first stage switching devices, each row containing a representation of a number of connections currently being serviced by connections established between the first stage switching device corresponding to that row and the center stage switching device to which the input connection load table corresponds;

(ii) providing an output connection load table having one row for each one of the $n_3$ third stage switching devices, each row containing a representation of a number of connections currently being serviced by connections established between the third stage switching device corresponding to that row and the center stage switching device to which the output connection load table corresponds;

(iii) storing in each row of the input connection load table a representation that no connections are currently being serviced by connections established between the first stage switching device corresponding to that row and the center stage switching device to which the input connection load table corresponds;

(iv) storing in each row of the output connection load table a representation that no connections are currently being serviced by connections established between the third stage switching device corresponding to that row and the center stage switching device to which the output connection load table corresponds;

(d) for each connection request received by the 3-stage switch fabric:

(i) for each center stage switching device having sufficient connection capacity to service the connection request, determining an average of input and output connection loads currently being serviced by the center stage switching device on input and output ports of the center stage switching device corresponding to input and output port requirements of the connection request;

(ii) if at least one center stage switching device has sufficient connection capacity to service the connection request and if the average has a lowest value for exactly one center stage switching device:

(1) scheduling the connection request on the exactly one center stage switching device;

(2) in the input connection load table corresponding to the exactly one center stage switching device, incrementing by one the representation contained in the row corresponding to the first stage switching device corresponding to the input port requirement of the connection request;

(3) in the output connection load table corresponding to the exactly one center stage switching device, incrementing by one the representation contained in each row corresponding to each third stage switching device corresponding to the output port requirement of the connection request;

(iii) if at least two center stage switching devices have sufficient connection capacity to service the connection request and if the average has a lowest value for two or more center stage switching devices:

(1) scheduling the connection request on a selected one of the two or more center stage switching devices;

(2) in the input connection load table corresponding to the selected one of the two or more center stage switching devices, incrementing by one the representation contained in the row corresponding to the first stage switching device corresponding to the input port requirement of the connection request;

(3) in the output connection load table corresponding to the selected one of the two or more center stage switching devices, incrementing by one the representation contained in each row corresponding to each third stage switching device corresponding to the output port requirement of the connection request; and, (iv) if no center stage switching device has sufficient connection capacity to service the connection request, failing to schedule the connection request.

12. A method as defined in claim 11, wherein the selected one of the two or more center stage switching devices is the lowest numbered one of the two or more center stage switching devices.

13. A method as defined in claim 12, wherein:
(a) each first stage switching device is non-blocking for unicast connections;
(b) each center stage switching device is non-blocking for a predefined level of multicast connections; and,
(c) each third stage switching device is non-blocking for unicast connections.

14. A method as defined in claim 11, wherein the selected one of the two or more center stage switching devices is a randomly selected one of the two or more center stage switching devices.

15. A method as defined in claim 14, wherein:
(a) each first stage switching device is non-blocking for unicast connections;
(b) each center stage switching device is non-blocking for a predefined level of multicast connections; and,
(c) each third stage switching device is non-blocking for unicast connections.

16. A method as defined in claim 11, further comprising determining the lowest value of the average by:
(a) initializing a previously determined lowest value of the average to a predefined initialization value;
(b) for each one of the $n_2$ center stage switching devices, if the previously determined lowest value of the average is one of:
(i) an initialization value;
(ii) greater than the average of the input and output connection loads currently being serviced by the center stage switching device on the input and output ports of the center stage switching device corresponding to the input and output port requirements of the connection request;
replacing the previously determined lowest value of the average with the average of the input and output connection loads currently being serviced by the center stage switching device on the input and output ports of the center stage switching device corresponding to the input and output port requirements of the connection request; and,
(c) then utilizing the previously determined lowest value of the average as the lowest value of the average.

17. A method as defined in claim 16, wherein:
(a) each first stage switching device is non-blocking for unicast connections;
(b) each center stage switching device is non-blocking for a predefined level of multicast connections; and,
(c) each third stage switching device is non-blocking for unicast connections.

18. A method as defined in claim 11, further comprising, for each connection deletion request received by the 3-stage switch fabric:
  (a) determining the center stage switching device on which a connection corresponding to the connection deletion request is currently scheduled;
  (b) in the input connection load table corresponding to the determined center stage switching device, decrementing by one the representation contained in the row corresponding to the first stage switching device corresponding to an input port requirement of the connection deletion request; and,
  (c) in the output connection load table corresponding to the determined center stage switching device, decrementing by one the representation contained in each row corresponding to each third stage switching device corresponding to an output port requirement of the connection deletion request.

19. A method as defined in claim 18, wherein:
  (a) each first stage switching device is non-blocking for unicast connections;
  (b) each center stage switching device is non-blocking for a predefined level of multicast connections; and,
  (c) each third stage switching device is non-blocking for unicast connections.

20. A method as defined in claim 11, wherein:
  (a) each first stage switching device is non-blocking for unicast connections;
  (b) each center stage switching device is non-blocking for a predefined level of multicast connections; and,
  (c) each third stage switching device is non-blocking for unicast connections.

* * * * *